US012657494B2

(12) United States Patent　　(10) Patent No.:　US 12,657,494 B2
Uno et al.　　　　　　　　　　　　(45) Date of Patent:　　Jun. 16, 2026

(54) QUANTUM-CLASSICAL HYBRID LEARNING SYSTEM USING OPTIMAL TRANSPORT LOSS AND PARAMETER SHIFT RULES

(71) Applicants:MIZUHO RESEARCH & TECHNOLOGIES, LTD., Tokyo (JP); Mizuho Financial Group, Inc., Tokyo (JP)

(72) Inventors: Shumpei Uno, Tokyo (JP); Hiroyuki Tezuka, Tokyo (JP)

(73) Assignees: MIZUHO RESEARCH & TECHNOLOGIES, LTD., Tokyo (JP); Mizuho Financial Group, Inc., Tokyo (JP)

( * ) Notice: Subject to any disclaimer, the term of this patent is extended or adjusted under 35 U.S.C. 154(b) by 506 days.

(21) Appl. No.: 18/338,598

(22) Filed: Jun. 21, 2023

(65) Prior Publication Data

US 2023/0419144 A1　　Dec. 28, 2023

(30) Foreign Application Priority Data

Jun. 23, 2022　　(JP) ................................. 2022-101100

(51) Int. Cl.
*G06N 10/20*　　　(2022.01)
*G06N 20/00*　　　(2019.01)

(52) U.S. Cl.
CPC ............. *G06N 10/20* (2022.01); *G06N 20/00* (2019.01)

(58) Field of Classification Search
CPC ........ G06N 10/20; G06N 20/00; G06N 3/045; G06N 3/0475; G06N 3/094; G06N 10/60; G06N 3/047
See application file for complete search history.

(56) References Cited

PUBLICATIONS

Kiani, B.T., De Palma, G., Marvian, M., Liu, Z.W. and Lloyd, S., "Learning quantum data with the quantum Earth Mover's distance," Cornell University, May 16, 2022, 38 pages. https://arxiv.org/pdf/2101.03037v2 (Year: 2022).*

Leadbeater C, Sharrock L, Coyle B, Benedetti M. F-divergences and cost function locality in generative modelling with quantum circuits. Entropy. Sep. 30, 2021;23(10):1281. (Year: 2021).*

Khatri et al., "Quantum-assisted quantum compiling," Cornell University, May 7, 2019, 29 pages. https://arxiv.org/abs/1807.00800.

(Continued)

*Primary Examiner* — KC Chen

(74) *Attorney, Agent, or Firm* — Kilpatrick Townsend & Stockton LLP

(57)　　　　　ABSTRACT

A quantum computation unit, a classical computation unit, and a management unit are provided to learn distribution of a quantum dataset. A structure of a generator is determined from multiple samples of latent variables and values of quantum circuit parameters. A ground cost and a gradient of the ground cost are calculated from the generator and the quantum dataset. An optimal transport loss and a gradient of the optimal transport loss are calculated using the ground cost and the gradient of the ground cost. An updating process is executed that updates the quantum circuit parameter using the gradient of the optimum transport loss, thereby reducing the optimum transport loss. The updating process is repeated until the optimum transport loss converges.

6 Claims, 4 Drawing Sheets

(56) References Cited

PUBLICATIONS

Mitarai et al., "Quantum Circuit Learning," Cornell University, Apr. 24, 2019, 7 pages. https://arxiv.org/abs/1803.00745.

Schuld et al., "Evaluating analytic gradients on quantum hardware," Cornell University, Nov. 27, 2018, 8 pages. https://arxiv.org/abs/1811.11184.

Dallaire-Demers et al., "Quantum generative adversarial networks," American Physical Society, Jul. 23, 2018, 10 pages. https://journals.aps.org/pra/abstract/10.1103/PhysRevA.98.012324.

* cited by examiner

$R_{\xi 1,1}(\theta_{1,1} Z_{\eta 1,1})$   $R_{\xi 2,1}(\theta_{2,1} Z_{\eta 2,1})$   $R_{\xi N_L,1}(\theta_{N_L,1} Z_{\eta N_L,1})$ $R_{\xi 1,2}(\theta_{1,2} Z_{\eta 1,2})$   $R_{\xi 2,2}(\theta_{2,2} Z_{\eta 2,2})$   $R_{\xi N_L,2}(\theta_{N_L,2} Z_{\eta N_L,2})$ $R_{\xi 1,3}(\theta_{1,3} Z_{\eta 1,3})$   $R_{\xi 2,3}(\theta_{2,3} Z_{\eta 2,3})$   $R_{\xi N_L,3}(\theta_{N_L,3} Z_{\eta N_L,3})$ $R_{\xi 1,n}(\theta_{1,n} Z_{\eta 1,n})$   $R_{\xi 2,n}(\theta_{2,n} Z_{\eta 2,n})$   $R_{\xi N_L,n}(\theta_{N_L,n} Z_{\eta N_L,n})$

Fig.6

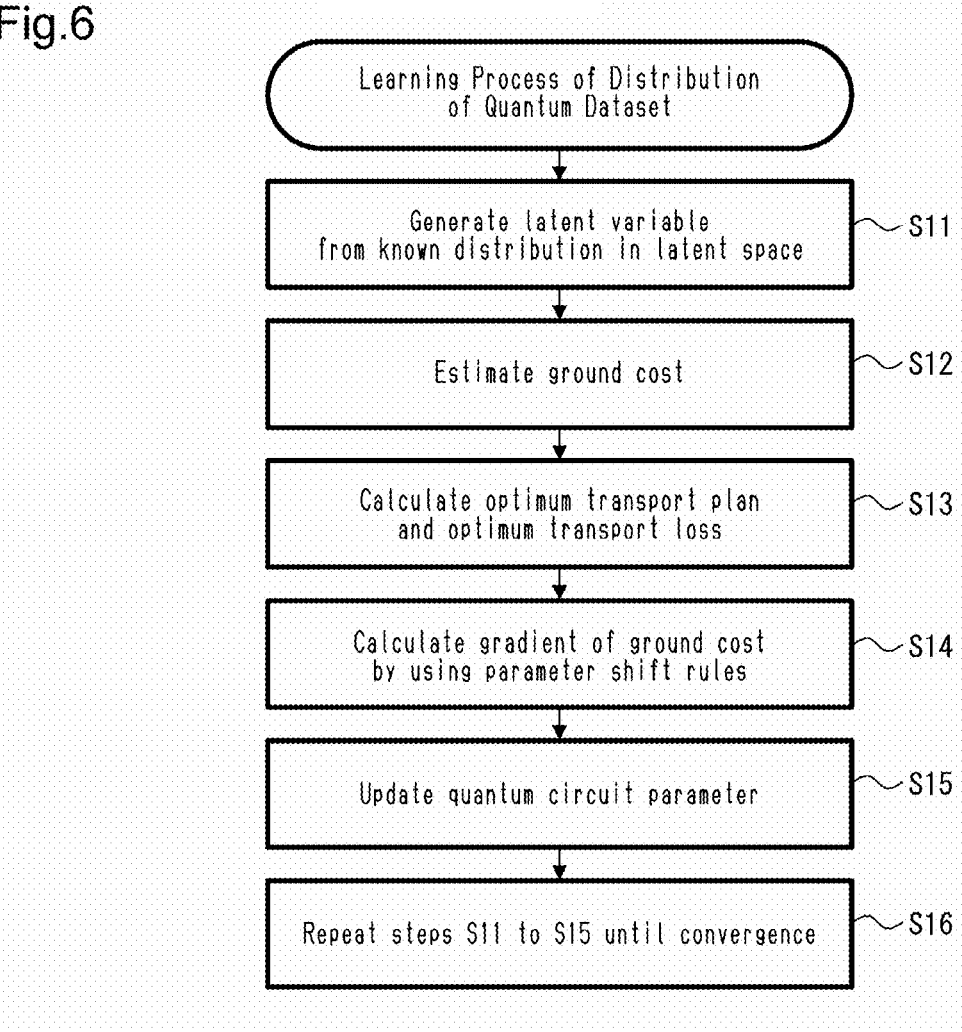

Learning Process of Distribution
of Quantum Dataset

Generate latent variable
from known distribution in latent space ～S11

Estimate ground cost ～S12

Calculate optimum transport plan
and optimum transport loss ～S13

Calculate gradient of ground cost
by using parameter shift rules ～S14

Update quantum circuit parameter ～S15

Repeat steps S11 to S15 until convergence ～S16

Fig.7

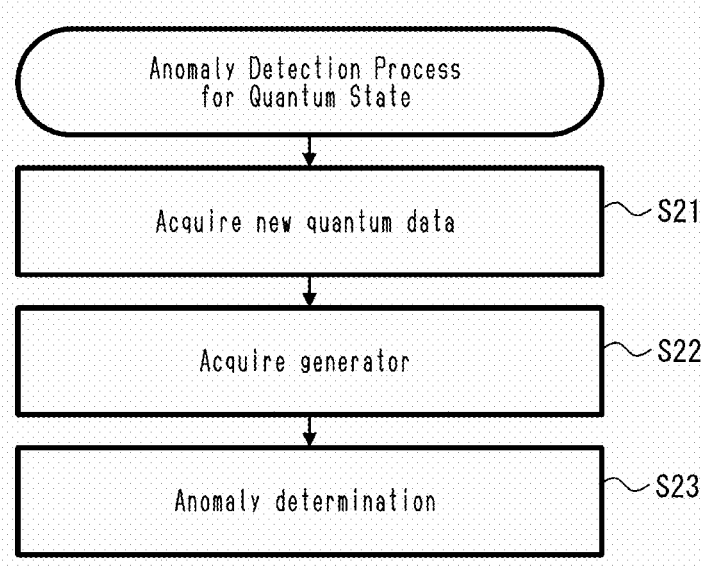

Anomaly Detection Process
for Quantum State

Acquire new quantum data ～S21

Acquire generator ～S22

Anomaly determination ～S23

QUANTUM-CLASSICAL HYBRID LEARNING SYSTEM USING OPTIMAL TRANSPORT LOSS AND PARAMETER SHIFT RULES

CROSS-REFERENCE TO RELATED APPLICATION

This application claims priority from Japanese Patent Application No. 2022-101100, filed on Jun. 23, 2022, the disclosure of which is incorporated herein by reference in its entirety.

BACKGROUND

1. Field

The present disclosure relates to a learning system, a learning method, and a storage medium for learning a distribution of a quantum dataset.

2. Description of Related Art

Machine learning using a quantum computer, that is, quantum machine learning, is a promising area to which the noisy intermediate-scale quantum (NISQ) computer is applicable. The quantum machine learning includes a type of learning that handles quantum data and a type of learning that handles classical data. Both types have been actively studied. In particular, when quantum data is used, quantum machine learning is expected to be significantly superior to machine learning using an existing computer (classical machine learning). Quantum machine learning is classified into supervised learning, unsupervised learning, reinforcement learning, and the like in the same manner in which classical machine learning is classified.

Generative models are one of the main tasks of unsupervised learning. A generative model aims at approximating a distribution existing behind a given dataset on the basis of that dataset. More specifically, a probability distribution behind a given dataset is defined as $\alpha(x)$. A probability distribution $\beta_\theta(x)$ parametrized by $\theta$ is used as a probability model. At this time, $\theta$ is learned so as to minimize an appropriate loss function $L(\alpha, \beta_\theta)$. In classical machine learning, generative models are widely studied for the purposes of anomaly detection, data generation, data structure learning, dimensionality reduction, and the like. However, there have been few examples of application of generative models to quantum computers.

In constructing a quantum generative model to generate quantum data, appropriate generators and loss functions have not been studied. Therefore, learning of the distribution of a quantum dataset has been difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect of the present disclosure, a learning system includes circuitry that includes a quantum computation unit, a classical computation unit, and a management unit to learn a distribution of a quantum dataset. The management unit is configured to control the quantum computation unit and the classical computation unit. The quantum computation unit includes an operating unit for a quantum state, a state maintaining unit that maintains the quantum state, and a measuring unit that measures the quantum state. The circuitry is configured to determine, by the classical computation unit, a structure of a generator from multiple samples of latent variables and values of quantum circuit parameters, calculate, by the quantum computation unit, a ground cost and a gradient of the ground cost from the generator and the quantum dataset, calculate, by the classical computation unit, an optimal transport loss and a gradient of the optimal transport loss using the ground cost and the gradient of the ground cost, execute, by the classical computation unit, an updating process that updates the quantum circuit parameter using the gradient of the optimum transport loss, thereby reducing the optimum transport loss, and repeat the updating process by the management unit until the optimum transport loss converges.

Other aspects of the present disclosure provide a learning method and a non-transitory computer readable storage medium that have features similar to those of the learning system.

Other features and aspects will be apparent from the following detailed description, the drawings, and the claims.

BRIEF DESCRIPTION OF THE DRAWINGS

FIG. 5 is an explanatory diagram of a quantum circuit defined as the generator shown in FIG. 4 according to the embodiment.

FIG. 6 is an explanatory diagram of a learning process of a distribution of a quantum dataset using the quantum circuit shown in FIG. 5 according to the embodiment.

FIG. 7 is an explanatory diagram of an anomaly detection process for a quantum state as an application example of the learning process shown in FIG. 6 according to the embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A learning system, a learning method, and a storage medium according to an embodiment will now be described with reference to FIGS. 1 to 7. In the present embodiment, a distribution behind a quantum dataset input from the outside is learned based on the quantum dataset.

Figure 1:
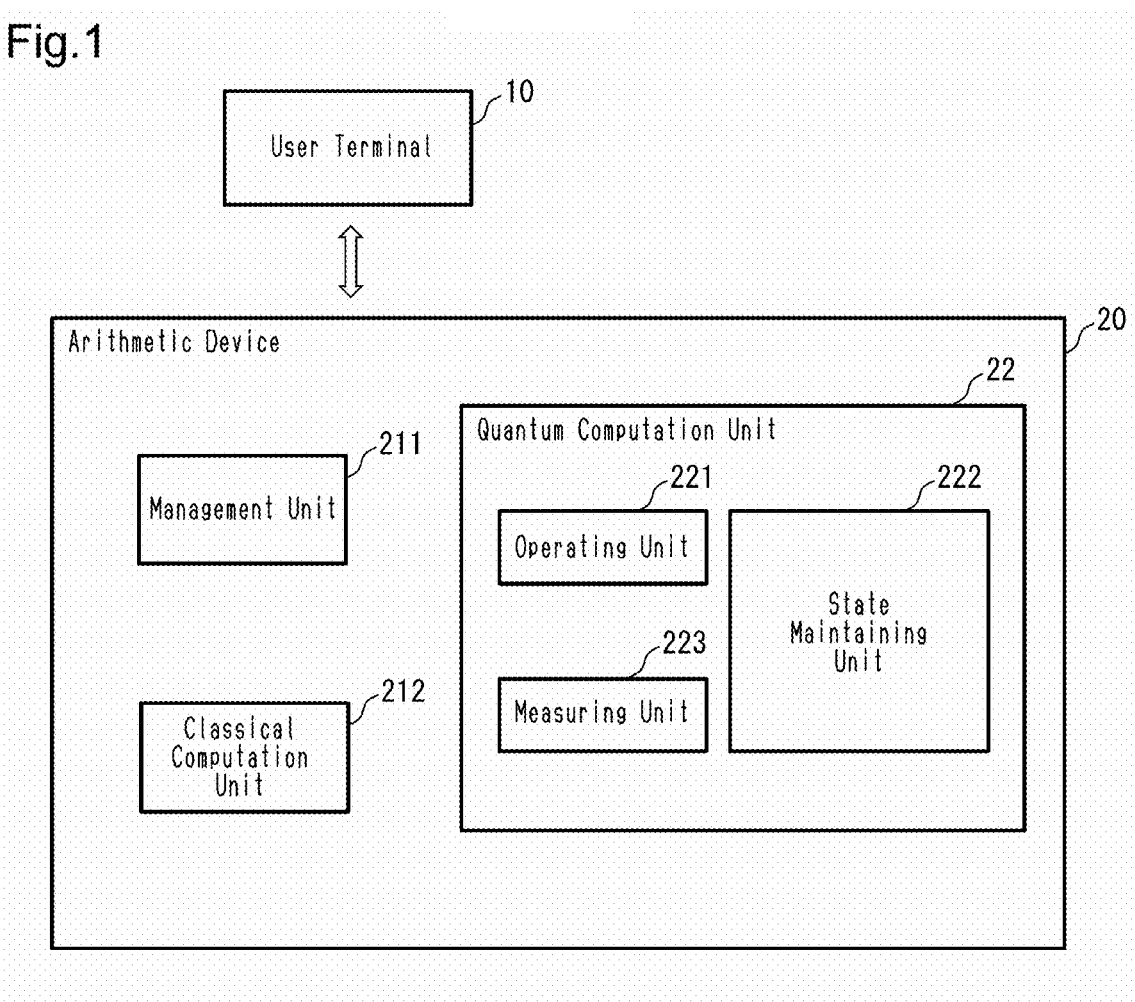
FIG. 1 is a schematic diagram of a system according to an embodiment.
Figure 2:
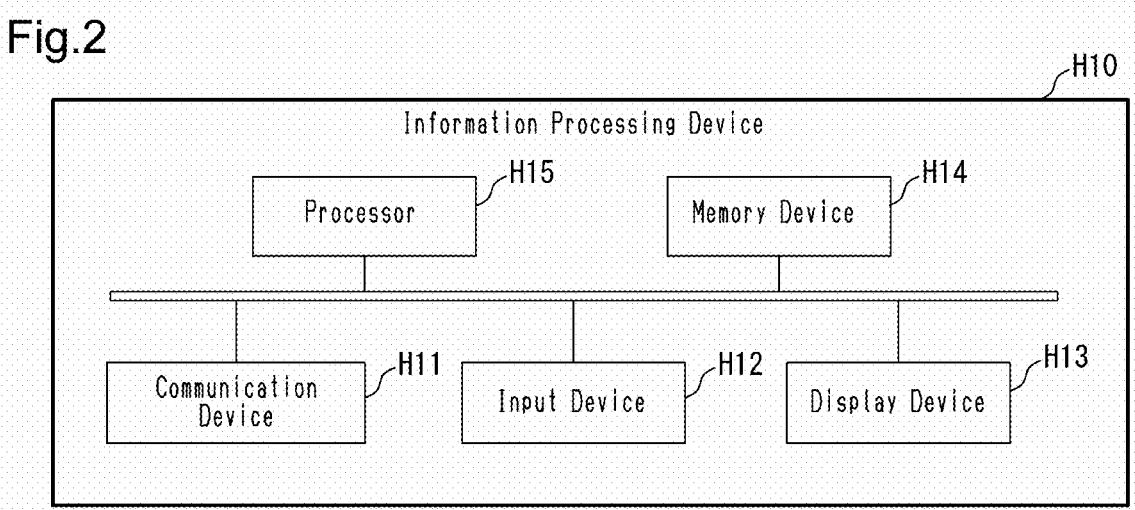
FIG. 2 is an explanatory diagram of a hardware configuration in the user terminal or the arithmetic unit shown in FIG. 1 according to the embodiment.

For this purpose, for example, a user terminal 10 and an arithmetic device 20 connected to each other via a network as shown in FIG. 1 are used.

Description of Hardware Configuration

The user terminal 10 or the arithmetic device 20 (a management unit 211 and a classical computation unit 212), which are shown in FIG. 1, are constructed by an information processing device H10. The hardware configuration of the information processing device H10 will now be described with reference to FIG. 2. The information processing device H10 includes a communication device H11, an input device H12, a display device H13, a memory device H14, and a processor H15. This hardware configuration is merely one example, and may be implemented by other hardware.

The communication device H11 is an interface that establishes communication paths with other devices so as to transmit and receive data. The communication device H11 is, for example, a network interface or a wireless interface.

The input device H12 receives input from a user, and is, for example, a mouse or a keyboard. The display device H13 is, for example, a display that displays various types of information.

The memory device H14 stores data and various programs used to perform various functions of the user terminal 10 or the arithmetic device 20. Examples of the memory device H14 include a ROM, a RAM, and a hard disk drive.

The processor H15 is a computer processor that uses programs and data stored in the memory device H14 to control processes in the user terminal 10 or the arithmetic device 20. Examples of the processor H15 include a CPU and an MPU. The processor H15 executes various processes for each service by deploying programs stored in the ROM or the like into the RAM.

The processor H15 is not limited to one that performs software processing for all processes executed by itself. For example, the processor H15 may include a dedicated hardware circuit (for example, an application specific integrated circuit) that executes at least part of the processes executed by itself. That is, the processor H15 may be circuitry including the following:

(1) One or more processors that operate according to a computer program;

(2) One or more dedicated hardware circuits that execute at least part of various processes; or (3) A combination of (1) and (2).

The processor includes a CPU and a memory such as a RAM and a ROM. The memory stores program codes or instructions configured to cause the CPU to execute processes. The memory, which is a computer readable storage medium, includes any type of non-transitory storage media that are accessible by general-purpose computers and dedicated computers. In other words, one or more computer-readable storage media store instructions that, when executed by one or more computer processors, cause the one or more computer processors to perform various operations.

System Configuration

Next, a system configuration of the user terminal 10 and the arithmetic device 20 will be described with reference to FIG. 1.

The user terminal 10 is a computer terminal used by a user.

The arithmetic device 20 is a computer for learning a distribution of a quantum dataset.

The arithmetic device 20 executes processes discussed below (processes such as a management stage, a quantum computation stage, and a classical computation stage). By executing programs for these processes, the arithmetic device 20 functions as the management unit 211, the classical computation unit 212, and a quantum computation unit 22.

The management unit 211 manages quantum computations and classical computations.

The classical computation unit 212 determines a structure of a generator from multiple samples of latent variables and values of quantum circuit parameters. The generator is constructed using a differentiable unitary operator. Further, the classical computation unit 212 executes an updating process that updates the quantum circuit parameter.

The quantum computation unit 22 performs quantum computation. In the present embodiment, the quantum computation unit 22 performs mapping dependent on latent variables of a latent space, i.e., a generator. Furthermore, the quantum computation unit 22 calculates a ground cost and the gradient of the ground cost from quantum dataset input from the outside and the generator.

The quantum computation unit 22 includes an operating unit 221, a state maintaining unit 222, and a measuring unit 223.

The operating unit 221 performs a quantum operation on qubits of the state maintaining unit 222 according to a quantum operation. In this case, the operating unit 221 operates (creates) the state maintained by the state maintaining unit 222 by using a quantum circuit including quantum gates or the like.

The state maintaining unit 222 includes multiple qubits and maintains an arbitrary quantum state. Each qubit maintains a superposition state of multiple values in an arbitrary physical state such as an electron level, an electron spin, an ion level, each spin, or a photon. The qubit is not limited to the above if a superposition state can be maintained.

The measuring unit 223 observes the superposition states of qubits of the state maintaining unit 222 in a calculation basis. The measuring unit 223 records a hit count in accordance with the states of the qubits in the state maintaining unit 222.

Generative Model and Optimal Transport Loss

Generative models are roughly classified into prescribed models and implicit models. A prescribed model uses a parameter $\theta$ to explicitly describe a probability density behind a dataset as a function. Thus, a prescribed model is capable of calculating a log-likelihood using a function. Also, the parameter $\theta$ can be obtained by maximum likelihood estimation or the like. In contrast, an implicit model creates samples that conform to a generative model without explicitly describing a probability density. One advantage of an implicit model is that it facilitates the representation of phenomena where a dataset is distributed on a relatively low-dimensional hyperplane within a vast entire sample space. Another advantage of an implicit model is that a phenomenon can be interpreted as a physical process that generates data.

An implicit model typically assumes random variables in a latent space, i.e. latent variables, whose dimensionality is sufficiently low compared to the dimensionality of the entire sample space. A generative model is represented using mapping, i.e., the generator, that transfers the latent variables to a sample space. The latent variables are assumed to follow a known distribution, such as a Gaussian distribution or a uniform distribution. In learning of an implicit model, the mapping parameter θ is learned by using an appropriate loss function so that a dataset and a distribution generated by a generator conform to each other.

In a generative model in classical machine learning, optimal transport loss/Wasserstein distance has attracted attention as a loss function. The optimal transport loss/Wasserstein distance has been exploited in various fields such as image analysis, natural language processing, finance, and the like. The optimal transport loss has the advantage of being applicable in particular when the likelihood cannot be calculated or when the support of probability distributions do not match. Further, the optimum transport loss has an advantage in that it can naturally incorporate the distance in the sample space. The optimum transport loss is defined by the following [Equation 1] as the minimum cost of moving a probability distribution $\alpha(x)$ to another probability distribution $\beta(x)$:

$$\mathcal{L}_c\left(\alpha,\beta\right) = \min_\pi \int c(x,\, y)\, d\pi(x,\, y) \qquad \text{[Equation 1]}$$

$$\text{subject to} \int \pi(x,\, y)\, dx = \beta(y),\ \int \pi(x,\, y)\, dy = \alpha(x)$$

where $c(x,\, y) \geq 0$ represents the transport cost from x to y and is referred to as a ground cost. A set of $\pi$ (paths) that minimizes the ground cost is referred to as an optimal transport plan.

In constructing a quantum generative model, (1) the generator and (2) the loss function must be examined.

A parameterized quantum circuit (PQC) may be used as a quantum data generator. In an existing generative model using a quantum computer (for example, a quantum GAN), it has been proposed to define a generator using PQC $U(\theta)$ so as to be expressed by the following [Equation 2]. For quantum-GAN, refer to, for example, Pierre-Luc Dallaire-Demers, and Nathan Killoran, "Quantum generative adversarial networks," American Physical Society, Jul. 23, 2018, https://journals.aps.org/pra/abstract/10.1103/Phys-RevA.98.012324.

$$\left|\psi_{\bar\theta}(\vec z)\right\rangle = U(\vec\theta)\left|\vec z\right\rangle \qquad \text{[Equation 2]}$$

where $|\Psi_\theta(z)\rangle$ is the distribution of quantum states.

In this circuit, quantum states with slightly different latent variables are orthogonal to each other. Therefore, it is difficult for this circuit to represent a continuous distribution in the quantum space.

In order to solve this problem, a PQC $G(\theta, z)$ including latent variables is used as a generator, as expressed by the following [Equation (3)].

$$\left|\psi_{\bar\theta}(\vec z)\right\rangle = G\left(\vec\theta,\, \vec z\right)\left|0\right\rangle \qquad \text{[Equation 3]}$$

Figure 5:
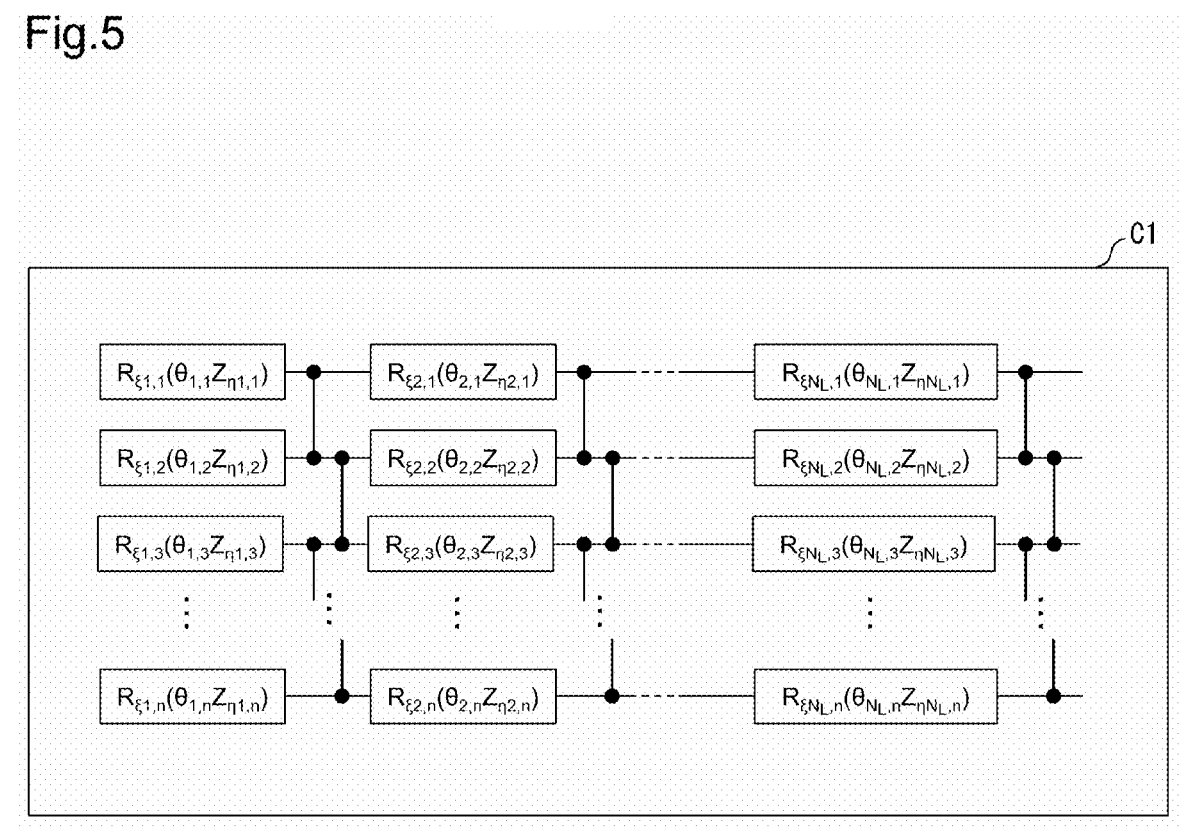

For example, a quantum circuit C1 shown in FIG. 5 can be used as the generator $G(\theta, z)$. In FIG. 5, $N_L$ is the number of layers constituting the generator $G(\theta, z)$. In the generator $G(\theta, z)$, layers having the same structure are repeatedly operated $N_L$ times. Within the i-th layer, the j-th qubit is first subjected to a single qubit Pauli rotation with an angle $\theta_{i,j} \times z \eta_{i,j}$ and a direction $k_{i,j}$. Thereafter, a ladder controlled-Z gate is operated on all qubits. The rotation direction $k_{i,j}$ and the direction $\eta_{i,j}$ of z are chosen randomly.

Next, the loss function will be described. With regard to the optimal transport loss, the ground cost $c(x, y)$ between samples of quantum states generated by a generator and given quantum data must be examined. Most simply, a trace distance based on superposition between quantum states may be used as the ground cost. However, if the trace distance is used, there is a problem that minimization of the loss function does not proceed in a large-scale system having a large number of qubits. That is, a barren plateau problem may occur.

Methods of solving the barren plateau problem include a cost function proposed in quantum-assisted quantum compilation (QAQC). For example, refer to Sumeet Khatri, Ryan LaRose, Alexander Poremba, Lukasz Cincio, Andrew T. Sornborger, Patrick J. Coles, "Quantum-assisted quantum compiling", arXiv.org, Cornell University, May 7, 2019, https://arxiv.org/abs/1807.00800. In QAQC, a method has been proposed that avoids the barren plateau problem by constructing a cost function using output results of individual qubits.

In the learning, the loss function is minimized by adjusting parameters of the parameterized quantum circuit (PQC), as in quantum circuit learning. For quantum circuit learning, refer to, for example, Kosuke Mitarai, Makoto Negoro, Masahiro Kitagawa, Keisuke Fujii, "Quantum circuit learning", arXiv.org, Cornell University, Apr. 24, 2019, https://arxiv.org/abs/1803.00745.

In order to minimize the loss function, it is important to obtain the gradient of the loss function with respect to the parameters of the PQC. A method (parameter shift rule) has been proposed that estimates the gradient of a loss function using a circuit having substantially the same structure as the original circuit. See, for example, Kosuke Mitarai, Makoto Negoro, Masahiro Kitagawa, Keisuke Fujii, "Quantum circuit learning", arXiv.org, Cornell University, Apr. 24, 2019, https://arxiv.org/abs/1803.00745 and Maria Schuld, Ville Bergholm, Christian Gogolin, Josh Izaac, Nathan Killoran, "Evaluating analytic gradients on quantum hardware", arXiv.org, Cornell University, Nov. 27, 2018, https://arxiv.org/abs/1811.11184.

Learning Process of Distribution of Quantum Datasets

A learning process of distribution of a quantum dataset will now be described with reference to FIG. 6.

When a quantum dataset $\{|\psi_1\rangle,\ |\psi_2\rangle,\ \ldots,\ |\psi_{N_r}\rangle\}$ including $N_r$ pieces of quantum data is given, a generative model that approximates the distribution of the quantum dataset is learned.

Figure 3:
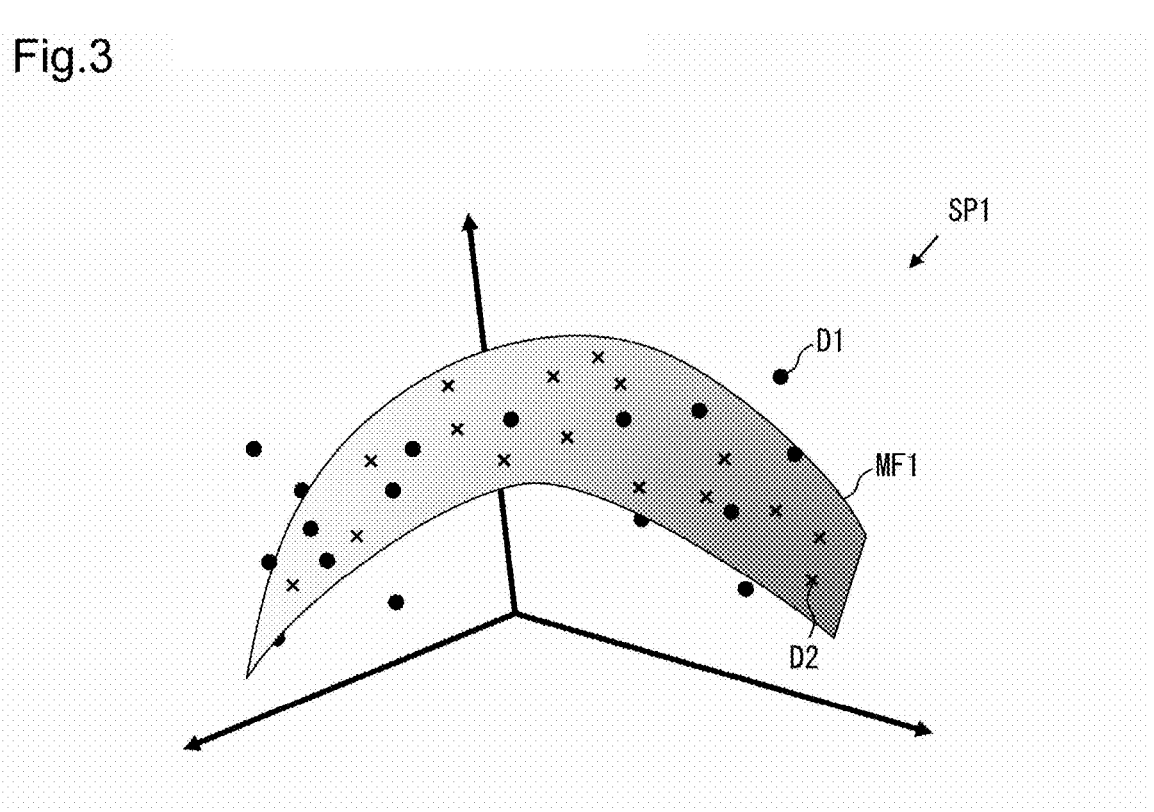
FIG. 3 is an explanatory diagram of a hyperplane in a data space of the embodiment.

As shown in FIG. 3, a hyperplane MF1(D2), which is a low-dimensional manifold, is learned to be as close as possible to a quantum dataset (D1) on a data space SP1. The dataset D1 indicated by dots is a quantum dataset on the dataset space SP1. In addition, the dataset D2 indicated by crosses is a quantum dataset on the hyperplane MF1.

Figure 4:
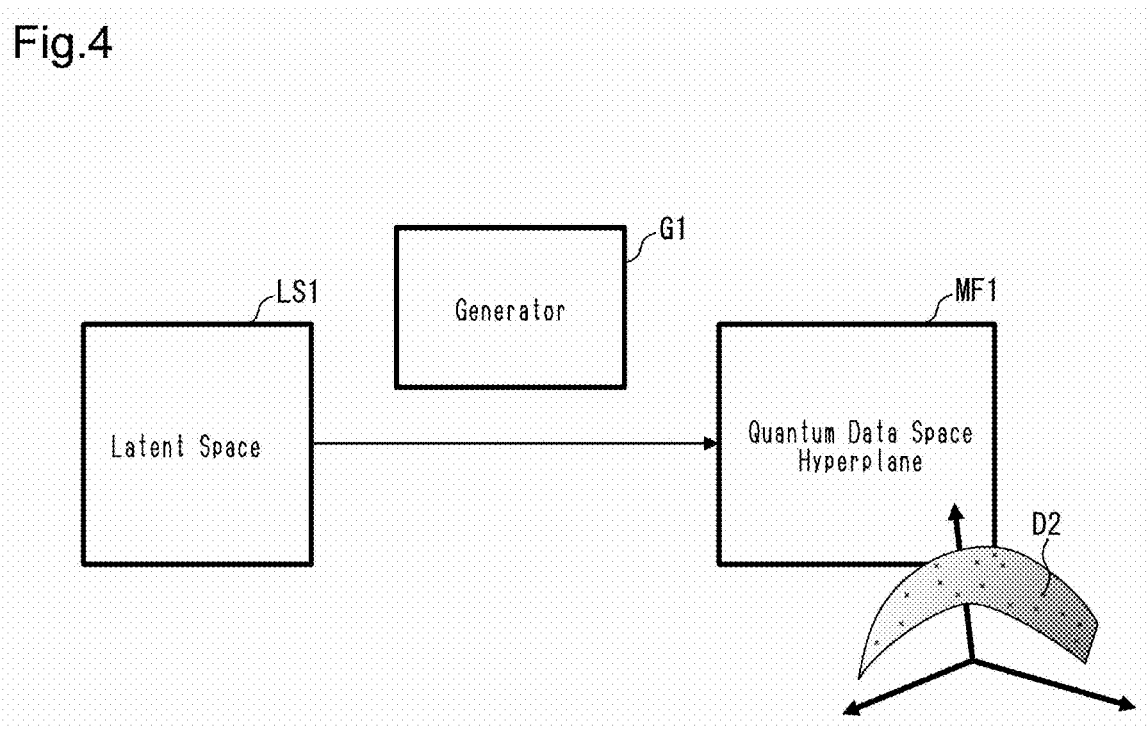
FIG. 4 is an explanatory diagram illustrating mapping from a latent space into the data space shown in FIG. 3 according to the embodiment.

As shown in FIG. 4, the dataset D2 is obtained by mapping samples on a latent space LS1 into the hyperplane MF1 using a generator G1.

For example, the quantum circuit C1 illustrated in FIG. 5 is defined as the generator $G(\theta, z)$. In the generator $G(\theta, z)$, layers having the same structure are repeatedly operated $N_L$ times. Within the i-th layer, all of the first to j-th qubits are subjected to a single qubit Pauli rotation with an angle $\theta_{i,j} \times z \eta_{i,j}$ and a direction $k_{i,j}$. Thereafter, a ladder controlled-Z gate is operated on all qubits. The rotation direction $k_{i,j}$ and the direction $\eta_{i,j}$ of z are chosen randomly.

As described above, such a generator $G(\theta, z)$ serves to map the distribution of the latent space LS1 into a distribution on the hyperplane MF1. Then, a quantum circuit parameter $\{\theta\}$ is learned so that the output of the generator $G(\theta, z)$ is as close as possible to the given quantum dataset.

First, the arithmetic device 20 generates a latent variable from a known distribution in the latent space LS1 (step S11). Specifically, the management unit 211 causes the classical computation unit 212 to generate samples $z_j$, the number of which is represented by Ng, as latent variables from the known distribution in the latent space LS1. That is, the samples $z_j$ are expressed by [Equation 4].

$$\text{Sample:} \{z_j\}_{j=1}^{N_g} \qquad \text{[Equation 4]}$$

Next, the arithmetic device 20 estimates the ground cost (step S12). The management unit 211 causes the quantum computation unit 22 to generate quantum state samples $\{G(\theta, z_1)|0\rangle, G(\theta, z_2)|0\rangle, \ldots, G(\theta, z_{N_g})|0\rangle\}$ from the quantum circuit parameter $\theta$ and the latent variable sample $z_j$. Next, the quantum computation unit 22 computes the ground cost $c_{local}$ from samples $\{G(\theta, z_1)|0\rangle, G(\theta, z_2)|0\rangle, \ldots, G(\theta, z_{N_g})|0\rangle\}$ and quantum datasets $\{|\psi_1\rangle, |\psi_2\rangle, \ldots, |\psi_{N_r}\rangle\}$. This calculation is performed by using the following [Equation 5], which is described in Pierre-Luc Dallaire-Demers, and Nathan Killoran, "Quantum generative adversarial networks," American Physical Society, Jul. 23, 2018, https://journals.aps.org/pra/abstract/10.1103/PhysRevA.98.012324.

$$c_{local}(|\psi_i\rangle, G(\theta, z_j)|0\rangle) = \sqrt{\frac{1}{n} \sum_{k=1}^{n} \left(1 - p_{i,j}^{(k)}\right)} \qquad \text{[Equation 5]}$$

$$p_{i,j}^{(k)} = Tr\left[P_0^k G^\dagger(\theta, z_j)|\psi_i\rangle\langle\psi_i|G(\theta, z_j)\right]$$

$$P_0^k = I_1 \otimes I_2 \otimes \ldots \otimes \overset{k-th\,bit}{\overline{|0\rangle\langle0|_k}} \otimes \ldots \otimes I_n$$

where n represents the number of qubits, $p_{i,j}^{(k)}$ represents a probability that the k-th qubit is 0, Tr represents the sum (trace) of diagonal components, and $I_i$ represents an identity operator that operates on the i-th qubit.

The quantum computation unit 22 approximates the ground cost $c_{local}$ by $N_s$ shots. An approximate value of the ground cost $c_{local}$ is expressed by the following [Equation (6)].

$$\text{Approximate value of ground cost } c_{local} : \{\hat{c}_{local,i,j}^{(N_g)}\}_{i,j=1}^{N_r,N_g} \qquad \text{[Equation 6]}$$

where $N_r$ represents the number of pieces of data in the quantum dataset, $N_g$ represents the number of samples of the latent variable, and $N_s$ is the number of shots (the number of shots for which the same state is prepared).

An approximate value of the ground cost $c_{local}$ is defined to be expressed by the following [Equation 7] using a random variable $X^{(s)}_{i,j,k}$ according to the Bernoulli distribution $Be(1-p^{(k)}_{i,j})$ of the probability $(1-p^{(k)}_{i,j})$.

$$\qquad \text{[Equation 7]}$$

$$\text{Random variable:} X_{i,j,k}^{(s)}(s = 1, 2, \ldots, N_s) \sim Be\left(1 - p_{i,j}^{(k)}\right)$$

$$\hat{c}_{local,i,j}^{(N_s)} = \sqrt{\frac{1}{n} \sum_{k=0}^{n} \frac{1}{N_s} \sum_{s=1}^{N_s} X_{i,j,k}^{(s)}}$$

The management unit 211 causes the classical computation unit 212 to calculate the optimum transport plan and the optimum transport loss at the time the parameter $\theta$ of the quantum circuit model $G(\theta, z)$ is fixed by using the approximate value of the ground cost $c_{local}$ as expressed by [Equation 8] (step S13).

$$\mathcal{L}_{\hat{c}_{local}^{(N_s)}}(\{|\psi\rangle_i\}_{i=1}^{N_r}, \{G(\theta, z_j)|0\rangle\}_{j=1}^{N_g}) = \qquad \text{[Equation 8]}$$

$$\min_{\{\pi_{i,j}\}_{i,j=1}^{N_r,N_g}} \sum_{i,j=1}^{N_r,N_g} \hat{c}_{local,i,j}^{(N_s)} \pi_{i,j} \text{ subject to } \sum_{i=0}^{N_r} \pi_{i,j} = \frac{1}{N_g},$$

$$\sum_{j=0}^{N_g} \pi_{i,j} = \frac{1}{N_F},$$

$$\pi_{i,j} \geq 0$$

where L represents the optimal transport loss, and $\pi_{i,j}$ is the transport plan between the i-th data $|\psi_i\rangle$ of the dataset and the sample $G(\theta, z_j)|0\rangle$.

Next, the management unit 211 causes the classical computation unit 212 to acquire an optimal transport plan $\{\pi_{i,j}\}$ and the optimal transport loss L by solving the linear programming of the above equation (first minimization).

Next, the arithmetic device 20 calculates the gradient of the ground cost by using parameter shift rules for calculating the gradients of parameters of a quantum circuit (step S14). For example, the parameter shift rules described in the following articles are used: Sumeet Khatri, Ryan LaRose, Alexander Poremba, Lukasz Cincio, Andrew T. Sornborger, Patrick J. Coles, "Quantum-assisted quantum compiling", arXiv.org, Cornell University, May 7, 2019, https://arxiv.org/abs/1807.00800, and Kosuke Mitarai, Makoto Negoro, Masahiro Kitagawa, Keisuke Fujii, "Quantum circuit learning", arXiv.org, Cornell University, Apr. 24, 2019, https://arxiv.org/abs/1803.00745. The gradient of the ground cost $c_{local}$ is approximated by $N_s$ shots. An approximate value of the gradient of the ground cost $c_{local}$ is expressed by the following [Equation 9].

[Equation 9]

Approximate value of gradient $$\text{of ground cost } c_{local}: \left\{ \frac{\partial}{\partial \theta_k} \tilde{C}_{local,i,j}^{(N_s)} \right\}_{i,j,k=1}^{N_r, N_g, N_p}$$

where $N_p$ is the number of quantum circuit parameters $\theta$.

The arithmetic device 20 updates the quantum circuit parameter $\{\theta\}$ using the learning rate and the gradient of the ground cost $c_{local}$ (Step S15). The management unit 211 causes the classical computation unit 212 to calculate the gradient of the optimum transport loss using the gradient of the ground cost $c_{local}$ and the optimum transport plan $\{\pi_{i,j}\}$ such that the gradient of the optimum transport loss is expressed by [Equation 10].

[Equation 10]

$$\text{Gradient of optimum transport loss:} \left\{ \frac{\partial}{\partial \theta_k} \mathcal{L}_{local} \right\}_{k=1}^{N_p}$$

The management unit 211 updates the quantum circuit parameter $\{\theta\}$ using the calculated gradient and learning rate (second minimization).

Next, the arithmetic device 20 repeats the process from step S11 to step S15 until convergence is achieved (step S16). The management unit 211 determines convergence in accordance with the value of the optimum transport loss. For example, when the optimum transport loss is not included in a specified range, the process of step S11 and the subsequent processes are repeated.

When the optimum transport loss is included in the specified range, the management unit 211 determines that convergence has occurred, and ends the learning process.

Anomaly Detection Process for Quantum State

Next, an anomaly detection process for a quantum state will be described as an application example of the learning process of the quantum data distribution with reference to FIG. 7. The anomaly detection process determines whether newly acquired quantum data is anomalous by comparing the newly acquired quantum data with a distribution learned from a training dataset.

First, the arithmetic device 20 acquires new quantum data (step S21). Specifically, in response to an instruction from the user terminal 10, the management unit 211 acquires quantum data (new quantum data) different from the dataset used for learning. Examples of the new quantum data include data input from the outside through observation, a quantum state output by quantum calculation, and the like.

Next, the arithmetic device 20 acquires a generator (step S22). The management unit 211 acquires a generator that is learned in advance using a quantum dataset (training dataset) during normal (stable) conditions.

Next, the arithmetic device 20 performs anomaly determination (step S23). The management unit 211 performs anomaly determination using the quantum circuit parameter $\{\theta\}$. For example, the management unit 211 searches for data closest to the new quantum data among the quantum states output by using the generator. Then, the management unit 211 calculates the distance between the new quantum data and the closest data, that is, the anomaly score of the new quantum data. Then, the management unit 211 compares the calculated anomaly score with a predetermined anomaly determination value. Based on the comparison result, the management unit 211 determines whether the new quantum data is anomalous, and outputs the determination result to the user terminal 10.

The present embodiment allows the distribution of the quantum dataset to be learned. Intuitively, the present embodiment is expected have the following advantages.

(1) In the present embodiment, the data of the latent space is mapped into a low-dimensional hyperplane MF1 in the data space SP1. Thus, mapping is used to generate a new quantum dataset that conforms to a distribution similar to the dataset.

(2) The present embodiment prevents gradients from vanishing by using the ground cost obtained by local measurement. Since learning using the optimum transport loss is possible, the distribution of the quantum dataset can be learned using the optimum transport loss as a loss function. That is, employing the optimum transport loss as a loss function generates a quantum generative model using an implicit model.

(3) In the present embodiment, the arithmetic device 20 estimates the ground cost (step S12), calculates the optimum transport loss (step S13), and updates the quantum circuit parameter $\{\theta\}$ using the learning rate and the gradient (step S15). Thus, the quantum circuit parameter $\{\theta\}$ that minimizes the optimum transport loss is calculated.

The above-described embodiment may be modified as follows. The above-described embodiment and the following modifications can be combined as long as the combined modifications remain technically consistent with each other.

In the above-described embodiment, anomaly detection of a quantum state is performed. That is, the above-described embodiment can be used to detect of an anomalous state. For example, the above-described embodiment can be applied to anomaly detection of a quantum computer, detection of a state with a low occurrence frequency (for example, gravity wave detection), or quantum sensing.

In addition, the above-described embodiment is also applicable to learning that uses quantum data obtained as a calculation result of a quantum computer. For example, the above-described embodiment can be used for learning of a quantum state obtained by a variational quantum eigensolver (VQE), transfer learning of a wave function of a Born machine, or the like. In addition, the above-described embodiment can be used as a surrogate model that simplifies calculation using a quantum state obtained as calculation in a quantum computer of quantum dynamics.

In addition, for example, the above-described embodiment may be applied to perform anomaly detection in a quantum dataset in which a classical dataset is embedded.

In the above-described embodiment, the ground cost is calculated using [Equation 7]. The calculation formula for calculating the ground cost is not limited to [Equation 7].

In the above-described embodiment, a known quantum circuit C1 shown in FIG. 5 is used as the generator $G(\theta, z)$. The generator $G(\theta, z)$ is not limited to the known quantum circuit C1.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A learning system, comprising circuitry that includes a quantum computation unit, a classical computation unit, and a management unit to learn a distribution of a quantum dataset, wherein the management unit is configured to control the quantum computation unit and the classical computation unit, the quantum computation unit includes:

an operating unit for a quantum state;

a state maintaining unit that maintains the quantum state; and a measuring unit that measures the quantum state, and the circuitry is configured to determine, by the classical computation unit, parameter mappings of a generator from multiple samples of latent variables and values of quantum circuit parameters, obtain the quantum dataset comprising a plurality of quantum states, calculate, by the quantum computation unit, a ground cost and a gradient of the ground cost from the generator and the quantum dataset, wherein the gradient is with respect to the quantum circuit parameters, calculate, by the classical computation unit, an optimal transport loss and a gradient of the optimal transport loss using the ground cost and the gradient of the ground cost, execute, by the classical computation unit, an updating process that updates the quantum circuit parameter using the gradient of the optimum transport loss, thereby reducing the optimum transport loss, and repeat the updating process by the management unit until a convergence criterion is satisfied associated with convergence of the optimum transport loss.

2. The learning system according to claim 1, wherein the circuitry is further configured to perform, by the management unit, anomaly determination on newly acquired quantum data according to the distribution.

3. The learning system according to claim 2, wherein the circuitry is further configured to perform, by the management unit, the anomaly determination by comparing a distribution in a quantum dataset serving as training data with the newly acquired quantum data.

4. The learning system according to claim 1, wherein the generator is constructed using a differentiable unitary operator.

5. A learning method, comprising:

providing a learning system to learn a distribution of a quantum dataset, the learning system including circuitry that includes a quantum computation unit, a classical computation unit, and a management unit, the management unit being configured to control the quantum computation unit and the classical computation unit, the quantum computation unit including an operating unit for a quantum state, a state maintaining unit that maintains the quantum state, and a measuring unit that measures the quantum state;

determining, by the classical computation unit, parameter mappings of a generator from multiple samples of latent variables and values of quantum circuit parameters;

obtain the quantum dataset comprising a plurality of quantum states, calculating, by the quantum computation unit, a ground cost and a gradient of the ground cost from the generator and the quantum dataset, wherein the gradient is with respect to the quantum circuit parameters;

calculating, by the classical computation unit, an optimal transport loss and a gradient of the optimal transport loss using the ground cost and the gradient of the ground cost;

executing, by the classical computation unit, an updating process that updates the quantum circuit parameter using the gradient of the optimum transport loss, thereby reducing the optimum transport loss; and repeating the updating process by the management unit until a convergence criterion is satisfied associated with convergence of the optimum transport loss.

6. A non-transitory computer readable storage medium that stores a program that causes a processor to execute a learning process, wherein the learning process determines parameter mappings of a generator from multiple samples of latent variables and values of quantum circuit parameters to learn a distribution of a quantum dataset, obtain the quantum dataset comprising a plurality of quantum states, calculates a ground cost and a gradient of the ground cost from the generator and the quantum dataset, wherein the gradient is with respect to the quantum circuit parameters, calculates an optimal transport loss and a gradient of the optimal transport loss using the ground cost and the gradient of the ground cost, executes an updating process that updates the quantum circuit parameter using the gradient of the optimum transport loss, thereby reducing the optimum transport loss, and repeats the updating process until a convergence criterion is satisfied associated with convergence of the optimum transport loss.

* * * * *